(12) United States Patent
Xiao et al.

(10) Patent No.: US 9,280,121 B2
(45) Date of Patent: Mar. 8, 2016

(54) ROTATIONAL FORCE DRIVING ASSEMBLY AND PROCESS CARTRIDGE

(71) Applicant: Zhuhai Seine Technology Co., Ltd., Zhuhai (CN)

(72) Inventors: Hongbiao Xiao, Zhuhai (CN); Jinlian Liu, Zhuhai (CN); Chao Wang, Zhuhai (CN); Hui Cao, Zhuhai (CN); Hailong Ma, Zhuhai (CN); De Chen, Zhuhai (CN); Jianxin Cao, Zhuhai (CN); Miaoling Yang, Zhuhai (CN); Likun Zeng, Zhuhai (CN)

(73) Assignee: APEX TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 14/496,379

(22) Filed: Sep. 25, 2014

(65) Prior Publication Data
US 2015/0093150 A1    Apr. 2, 2015

(30) Foreign Application Priority Data

Sep. 29, 2013  (CN) .......................... 2013 1 0460347
Jun. 12, 2014  (CN) ....................... 2014 2 0313988 U
Jul. 2, 2014   (CN) ....................... 2014 2 0363432 U

(51) Int. Cl.
| G03G 21/18 | (2006.01) |
|---|---|
| G03G 15/00 | (2006.01) |
| F16D 3/18 | (2006.01) |
| F16D 3/04 | (2006.01) |
| F16D 3/10 | (2006.01) |
| F16D 3/16 | (2006.01) |
| F16D 3/205 | (2006.01) |

(52) U.S. Cl.
CPC ................. *G03G 15/757* (2013.01); *F16D 3/04* (2013.01); *F16D 3/10* (2013.01); *F16D 3/16* (2013.01); *F16D 3/18* (2013.01); *F16D 3/2052* (2013.01); *G03G 21/186* (2013.01)

(58) Field of Classification Search
CPC ............ G03G 15/757; G03G 21/1857; G03G 21/186; F16D 3/04; F16D 3/10; F16D 3/16; F16D 3/18; F16D 3/2052
See application file for complete search history.

(56) References Cited

U.S. PATENT DOCUMENTS

| 7,869,735 B2 * | 1/2011 | Hattori ............................. 399/98 |
|---|---|---|
| 2012/0275824 A1* | 11/2012 | Gu et al. ........................ 399/111 |
| 2013/0064569 A1* | 3/2013 | Ueno et al. .................... 399/111 |
| 2013/0136492 A1* | 5/2013 | Xu ................................. 399/111 |

* cited by examiner

*Primary Examiner* — David Gray
*Assistant Examiner* — Laura Roth
(74) *Attorney, Agent, or Firm* — Troutman Sanders LLP

(57) ABSTRACT

The present invention relates to a rotational force driving assembly and a process cartridge used for being engaged with a rotational force driving head inside an electrophotographic image forming device. The rotational force driving assembly can comprise a hub, a rotational force receiving component, a side plate, and an axis offset adjusting mechanism. When the axis offset adjusting mechanism is not subjected to external force, the axis offset adjusting mechanism enables the axis of the rotational force receiving component to be parallel and offset to the axis of the hub. When the axis offset adjusting mechanism is subjected to external force, the rotational force receiving component extends out to be engaged with the rotational force driving head.

12 Claims, 13 Drawing Sheets

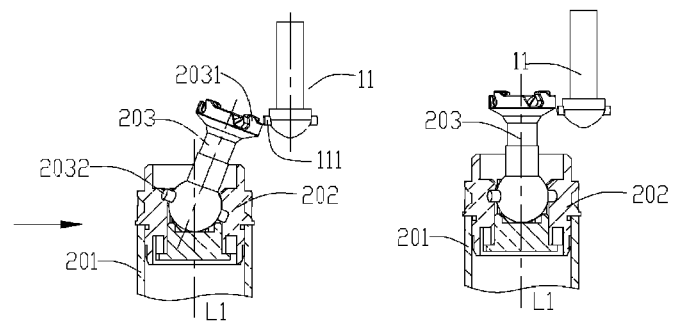
Prior Art
Fig. 1a
Prior Art
Fig. 1b
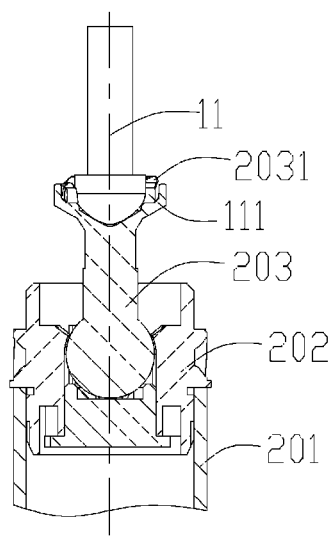
Prior Art
Fig. 2

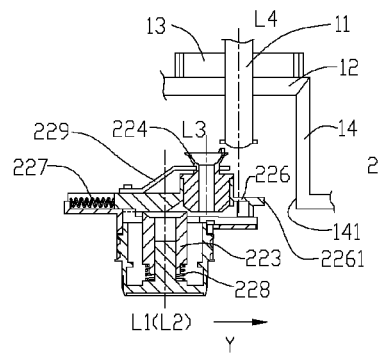
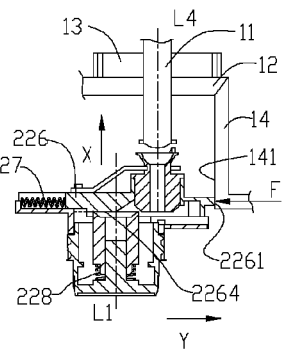
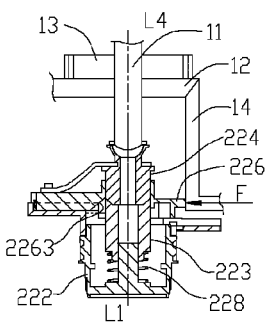
Fig. 16a          Fig. 16b          Fig. 16c
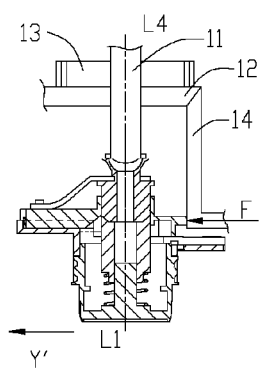
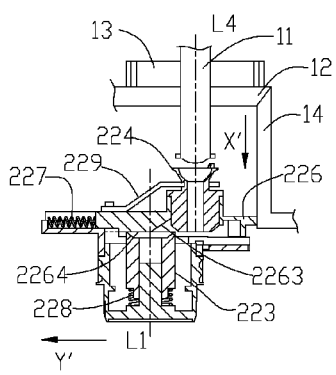
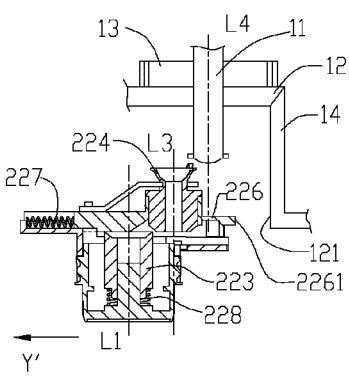
Fig. 17a          Fig. 17b          Fig. 17c

ROTATIONAL FORCE DRIVING ASSEMBLY AND PROCESS CARTRIDGE

CROSS-REFERENCE

This application claims priority to Chinese Application Number. 201310460347.X filed Sep. 29, 2013, Chinese Application Number 201420313988.2 filed Jun. 12, 2014 and Chinese Application Number 201420363432.4 filed Jul. 2, 2014.

FIELD OF THE INVENTION

The present invention relates to a process cartridge for an electrophotographic image forming device, and particularly relates to a rotational force driving assembly in the process cartridge.

FIELD OF THE INVENTION AND RELATED ART

A process cartridge in the prior art is detachably installed in an electrophotographic image forming device. Said electrophotographic image forming device is internally provided with a rotational force driving head. Said process cartridge comprises a photosensitive member for bearing an image carrier and a photosensitive member hub provided at one end of said photosensitive member, inclined teeth are arranged on the outer circumference of said photosensitive member hub, the interior of the photosensitive member hub is provided with a cavity, and meanwhile a rotational driving force receiver which is capable of being engaged with a rotational force driving head inside said electrophotographic image forming device and is used for transmitting rotational force to said photosensitive member is arranged on the photosensitive member hub.

FIG. 1 to FIG. 2 illustrates the engaging process of the rotational force driving head and the rotational driving force receiving head in the prior art. As shown in FIG. 1a, 11 is the rotational force driving head in the electrophotographic image forming device, and transmission pins 111 for transmitting force are arranged on the rotational force driving head; 201 is a photosensitive member arranged in the process cartridge, 202 is a photosensitive member hub provided at one end of said photosensitive member, and 203 is the rotational driving force receiving head arranged on said photosensitive member hub; a force transmission part 2032 capable of being engaged with said photosensitive member hub to transmit force and a force receiving part 2031 capable of being engaged with the transmission pins 111 on said rotational force driving head 11 to transmit the force are arranged on said rotational driving force receiving head. During the process that the process cartridge is installed in the electrophotographic image forming device, the rotational driving force receiving head needs to be inclined (as shown in FIG. 1a) relative to the axis L1 of said photosensitive member in advance. As shown in FIG. 1a, during the installation process of the process cartridge, the looseness of internal parts of the electrophotographic image forming device is caused by assembly error; during the installation process of the process cartridge, the part, close to the rotational force driving head, of the rotational driving force receiving head 203 may interfere with said rotational force driving head, while along with continuous installation of the process cartridge, the rotational force driving head 11 promotes the rotational driving force receiving head to be straightened, but if the rotational force receiving head 11 is incapable of being engaged with the rotational driving force receiving head 203 normally, the process cartridge cannot be installed in place, the condition as shown in FIG. 1b may appear, and thus normal engagement between the rotational driving head 11 and the rotational driving force receiving head 203 as shown in FIG. 2 cannot be realized.

SUMMARY OF THE INVENTION

The primary object of the present invention is to provide a rotational force driving assembly capable of solving the above described problem of the conventional rotational driving force receiver.

Another object of the present invention is to provide a photosensitive member, a rotational force driving assembly used in photosensitive member, capable of solving the above described problem of the conventional photosensitive member.

A further object of the present invention is to provide a process cartridge, a rotational force driving assembly used in the process cartridge, capable of solving the above described problem of the conventional process cartridge.

In order to achieve the all above objects, a rotational force driving assembly provided in the present invention comprising a hub, a rotational force receiving component for driving the hub to rotate and a side plate provided at one end of the hub. The rotational force driving assembly further comprising an axis offset adjusting mechanism. Two ends of the axis offset adjusting mechanism can be respectively connected with the hub and the rotational force receiving component which is provided on the side plate and can slide relative to the side plate. When the rotational force driving assembly is not subjected to external force, the axis offset adjusting mechanism enables the axis of the rotational force receiving component to make parallel offset relative to the axis of the hub. After the rotational force driving assembly is installed in place in the electrophotographic image forming device, the axis offset adjusting mechanism is subjected to the external force to move relative to the side plate, so that the axis of the rotational force receiving component is coincident with the axis of the hub, and the rotational force receiving component extends out along the axial direction of the hub to be engaged with a rotational force driving head.

A further plan is to provide the driving assembly further comprising an intermediate force transmission component, and the intermediate force transmission component is mutually engaged with the rotational force receiving component and the hub to transmit force.

A further plan is to provide the axis offset adjusting mechanism comprises a sliding piece and a first elastic element. The sliding piece is connected with the rotational force receiving component. The first elastic element respectively abuts against the plate and the sliding piece. When the rotational force driving assembly is not subjected to external force, the first elastic element enables the sliding piece to make parallel offset relative to the axis of the hub. After the rotational force driving assembly is installed in place in the electrophotographic image forming device, the sliding piece is subjected to the external force to move relative to the side plate, so that the rotational force receiving component extends out along the axial direction of the hub to be engaged with the rotational force driving head.

A further plan is to provide A sliding rail is arranged on the side plate. A sliding piece is connected with the side plate through the sliding rail. A handle end matched with the sliding rail is arranged on the sliding piece, and an accommodating groove for accommodating the first elastic element is formed in the handle end.

A further plan is to provide the intermediate force transmission component comprises a first end spherical part, a second end spherical part and an intermediate connecting part. The first end spherical part is provided with a first force transmission part capable of being engaged with the hub. The second end spherical part is provided with a second force transmission part capable of being engaged with the rotational force receiving component.

A further plan is to provide the rotational force driving assembly further comprising a second elastic element arranged between the intermediate force transmission component and the hub. The intermediate force transmission component is arranged in the hub. The sliding piece comprises an inner hole. A cylinder part is arranged at one end of the rotational force receiving component. The cylinder part is matched with the inner hole of the sliding piece.

A further plan is to provide the rotational force driving assembly further comprising a second elastic element arranged between the intermediate force transmission component and the hub. The intermediate force transmission component is arranged in the hub. The sliding piece is provided with the bottom surface and the inner hole. The rotational force receiving component is arranged to be matched with the inner hole and can axially slide relative to the inner hole. The bottom surface abuts against the intermediate force transmission component. The intermediate force transmission component is at the retracting state when the bottom surface abuts against the intermediate force transmission component.

A further plan is to provide a recess is formed in one end of the rotational force receiving component. The intermediate force transmission component comprises an end spherical part. The buffer piece is provided in the recess. The end spherical part abuts against the buffer piece. The rotational force receiving component and the intermediate force transmission component are connected through a pin or a latch.

A further plan is to provide the rotational force driving assembly further comprises a connecting column and a connecting pin. The connecting pin penetrates through a hole for connecting the intermediate force transmission component and the connecting column. The connecting column is connected to the hub.

A further plan is to provide the rotational force driving assembly further comprise guiding mechanisms. The guiding mechanisms are arranged on the connecting column and the hub so that the connecting column is installed inside the hub along the guiding mechanisms.

A process cartridge provided in the present invention comprises a cartridge, a rotational force driving assembly used for being engaged with a rotational force driving head inside an electrophotographic image forming device so as to transmit rotational driving force. The rotational force driving assembly comprising a hub, a rotational force receiving component for driving the hub to rotate and a side plate provided at one end of the hub. The rotational force driving assembly further comprising an axis offset adjusting mechanism. Two ends of the axis offset adjusting mechanism can be respectively connected with the hub and the rotational force receiving component which is provided on the side plate and can slide relative to the side plate. When the rotational force driving assembly is not subjected to external force, the axis offset adjusting mechanism enables the axis of the rotational force receiving component to make parallel offset relative to the axis of the hub. After the rotational force driving assembly is installed in place in the electrophotographic image forming device, the axis offset adjusting mechanism is subjected to the external force to move relative to the side plate, so that the axis of the rotational force receiving component is coincident with the axis of the hub, and the rotational force receiving component extends out along the axial direction of the hub to be engaged with a rotational force driving head.

After the technical scheme is adopted, the intermediate force transmission component capable of being engaged with the hub and the rotational force receiving component at the two ends respectively, the sliding piece arranged on the side plate and capable of sliding relative to the side plate, and the first elastic element abutting against the side plate and the sliding piece respectively are additionally arranged, the rotational force receiving component is matched with the sliding piece, when the rotational force driving assembly is not subjected to external force, the axis of the rotational force receiving component and the axis of the hub are enabled to make parallel offset under the elastic effect of the first elastic element, and after the rotational force driving assembly is installed in place in the electrophotographic image forming device, the elastic effect of the first elastic element is overcome, so that the sliding piece slides to the axis of the rotational force receiving component to be coincident with the axis of the hub, two ends of the intermediate force transmission component are respectively engaged with the hub and the rotational force receiving component, and the rotational force receiving component extends out along the axial direction of the hub to be engaged with the rotational force driving head so as to drive the hub to rotate. Namely, when the rotational force receiving component is driven to move on the surface of the side plate to the axis of the rotational force receiving component through the sliding of the sliding piece to be coincident with the axis of the hub, the rotational force receiving component completely extends out to be engaged with the rotational force driving head inside the electrophotographic image forming device so as to transmit the rotational driving force, and thus interference cannot occur during the installation process and the technical problem that installation interference between the rotational force driving assembly and the rotational force driving head is solved.

BRIEF DESCRIPTION OF THE DRAWINGS

FIG. 1a illustrates a structural schematic diagram of the prior art.

FIG. 1b illustrates a schematic diagram of interference in the prior art.

FIG. 2 illustrates a schematic diagram of engagement realized by a force transmission mechanism in the prior art.

FIG. 16a illustrates a schematic diagram of the installation process of the process cartridge in the second embodiment.

FIG. 16b illustrates a schematic diagram of the installation process of the process cartridge in the second embodiment.

FIG. 16c illustrates a schematic diagram that the process cartridge is installed in place in the second embodiment.

FIG. 17a illustrates a schematic diagram of the disassembly process of the process cartridge in the second embodiment.

FIG. 17b illustrates a schematic diagram of the disassembly process of the process cartridge in the second embodiment.

FIG. 17c illustrates a schematic diagram of the disassembly process of the process cartridge in the second embodiment.

DESCRIPTION OF THE PREFERRED EMBODIMENTS

The following specifically illustrates the technical scheme of the present invention in combination with embodiments.

Embodiment 1

FIG. 3 to FIG. 12 illustrate the first embodiment of the present invention.

Figure 3:
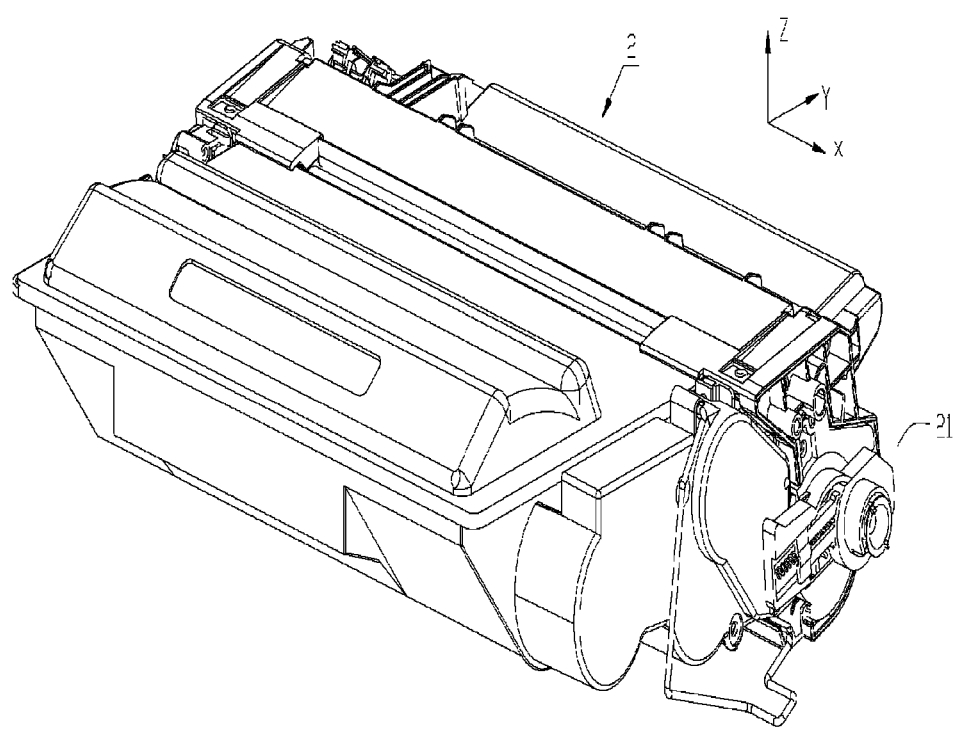
FIG. 3 illustrates a stereo view of a process cartridge in the present invention.

FIG. 3 illustrates a stereo view of a process cartridge 2, 21 is a rotational force driving assembly provided at one end of the process cartridge in the longitudinal direction, and the driving assembly 21 is provided at one end of a photosensitive member. The longitudinal direction of the illustrated process cartridge 2 is the X-coordinate direction in diagram form, the photosensitive member is arranged along the longitudinal direction of said process cartridge, and thus the axial direction of said photosensitive member is the same as the X-axis direction; Y direction is another direction vertical to the X direction, namely the installation direction of the process cartridge during the process that the process cartridge is installed in the electrophotographic image forming device in the scheme; Z direction is a direction vertical to the X direction and the Y direction respectively.

Figure 4:
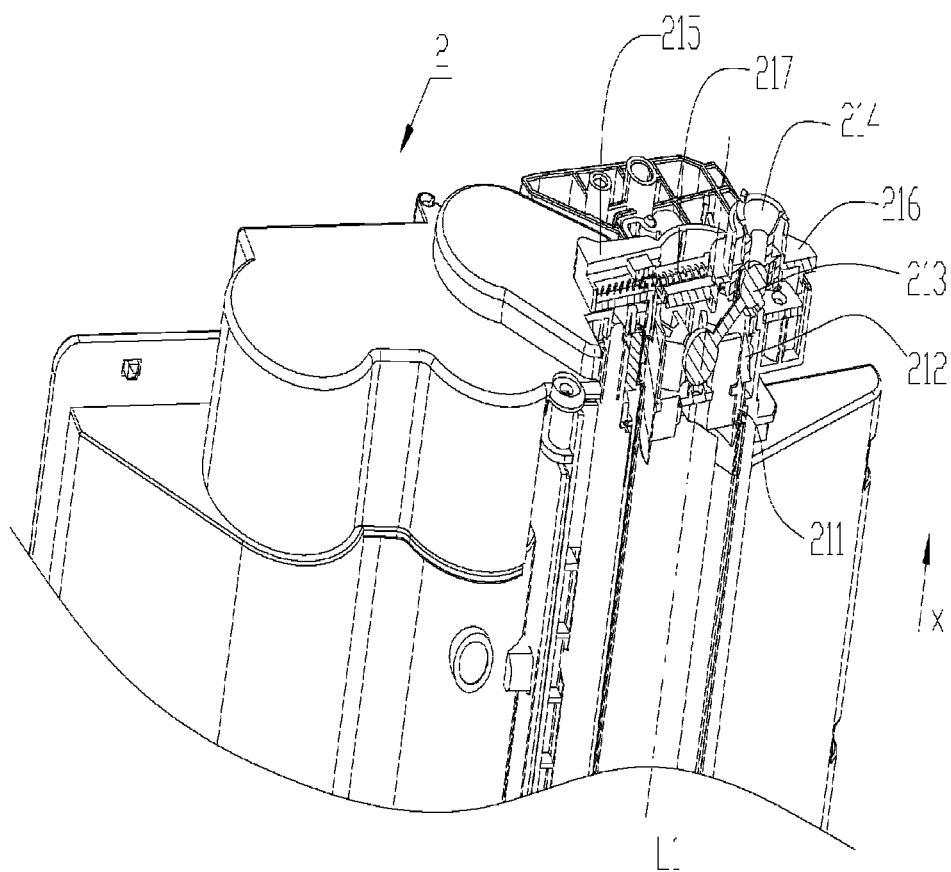
FIG. 4 illustrates a partial section view of the process cartridge in the present invention.

FIG. 4 is a partial section view of the process cartridge cut along the L1-axis direction of said photosensitive member, and can clearly show the setting condition of said driving assembly 21 in the process cartridge 2. As shown in the figure, 211 is the photosensitive member arranged inside the process cartridge along the longitudinal direction of said process cartridge; 212 is a photosensitive member hub provided at one end of said photosensitive member, an inclined gear for transmitting force is arranged on the outer circumference of said photosensitive member hub, a cavity is formed in the interior of the photosensitive member hub, and said photosensitive member and said photosensitive member hub are relatively and fixedly connected and are coaxially arranged; 213 is an intermediate force transmission component of the driving assembly in the embodiment, and 214 is a rotational force receiving component used for being engaged with a rotational force driving head arranged inside the electrophotographic image forming device to transmit force, wherein one end of the intermediate force transmission component 213 is arranged inside the cavity of said photosensitive member hub and is engaged with said photosensitive member hub 212 to transmit the force, and the other end of the intermediate force transmission component 213 is engaged with said rotational force receiving component 214 to transmit the force; 215 is a side plate provided at one end of said photosensitive member hub 212, and 216 is a sliding piece which is arranged on the side plate and can slide relative to said side plate 215; and 217 is a first elastic element capable of enabling said sliding piece 216 to recover to the initial state.

After said rotational force receiving component 214 is engaged with the rotational force driving head 11 inside the electrophotographic image forming device, the force is transmitted to said photosensitive member hub 212 through said intermediate force transmission component 213, and thus said photosensitive member 211 is driven to rotate.

Said driving assembly in the present invention comprises the photosensitive member hub, the intermediate force transmission component, the rotational force receiving component, the side plate and the axis offset adjusting mechanism; said axis offset adjusting mechanism is provided on said side plate and can slide relative to said side plate, and said axis offset adjusting mechanism comprises said sliding piece and said first elastic element.

Figures 5, 6:
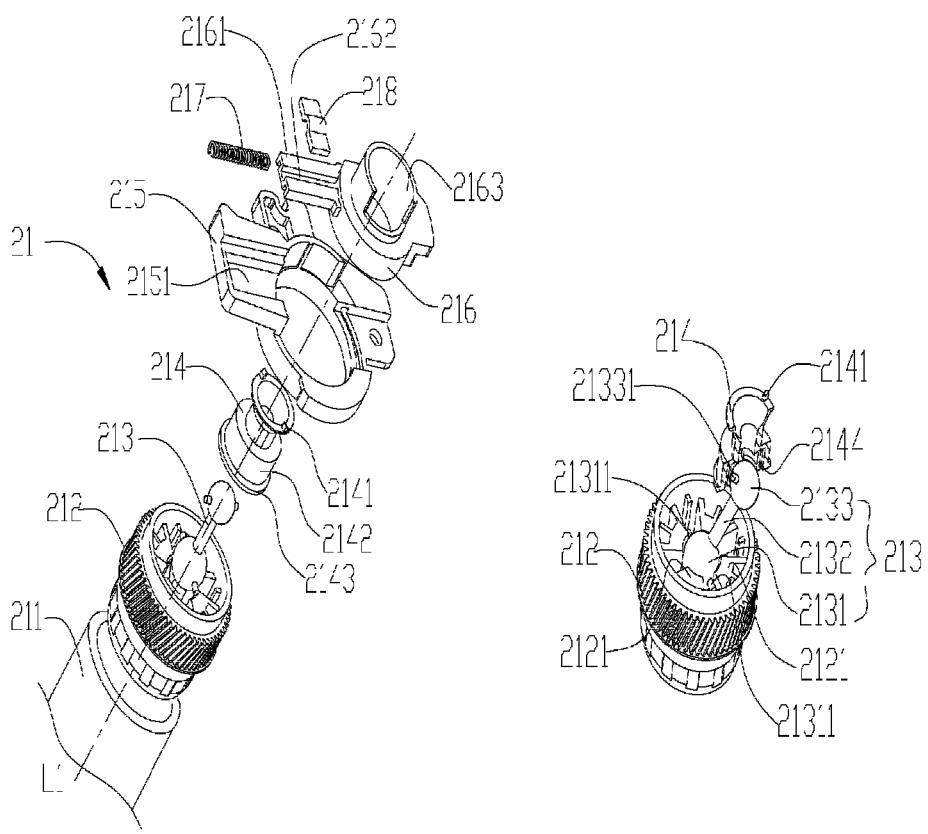
FIG. 5 illustrates an assembly schematic diagram of a first embodiment in the present invention.
FIG. 6 illustrates a stereo view of a force transmission part in the first embodiment of the present invention.

FIG. 5 is an assembly decomposition view of the driving assembly 21 in the embodiment. The photosensitive member hub 212 is provided on the end of the photosensitive member 211, one end of the intermediate force transmission component 213 is connected with said photosensitive member hub 212, and the other end of the intermediate force transmission component 213 is connected with said rotational force receiving component 214; the rotational force receiving component 214 is provided with a claw 2141 for receiving the force, a cylinder part 2142 and a boss part 2143, said boss part is used for preventing the rotational force receiving component 214 from disengaging; the side plate 215 is provided at one end of said photosensitive member hub 212, a sliding rail 2151 is arranged on the side plate 215, the sliding piece 216 is arranged on said side plate 215, and the side plate 215 does not move relative to the photosensitive member hub 212; the sliding piece 216 is provided with a handle end 2161 matched with said sliding rail 2151, an accommodating groove 2162 of the first elastic element 217 is further formed in the handle end 2161, an inner hole 2163 which is matched with said rotational force receiving component 214 and can drive the rotational force receiving component 214 to move is further formed in the sliding piece 216, the inner hole 2163 is matched with the cylinder part 2142 on the rotational force receiving component, and said cylinder part 2142 can slide along the axial direction of the photosensitive member relative to the inner hole 2163; according to the embodiment, the handle end 2161 of the sliding piece and the first elastic element 217 are further limited in the sliding rail 2151 of the side plate 215 through a compressing piece 218, the compressing piece 218 and the side plate 215 are relatively and fixedly arranged or a compressing part is arranged on the side plate 215; said sliding rail can be arranged to be a sliding groove and can also be a key, and a matched sliding groove is arranged on the sliding piece 215 correspondingly, so that the sliding piece 216 can slide relative to the side plate 215.

FIG. 6 is used for specifically illustrating connection relation among the intermediate force transmission component 213, the photosensitive member hub 212 and the rotational force receiving component 214. As shown in FIG. 6, the photosensitive member hub 212 is provided with a plurality of stress columns 2121 in the inner circumference direction; the intermediate force transmission component 213 comprises a first end spherical part 2131, a second end spherical part 2133 and an intermediate connecting part 2132, wherein a first force transmission part 21311 and a second force transmission part 21331 are respectively arranged on the first end spherical part 2131 and the second end spherical part 2133, and said force transmission parts 21311 and 21331 extend out along the radial direction of said intermediate force transmission component 213; the interior of the rotational force receiving component 214 is hollow, the symmetrically arranged claw 2141 in the circumference direction for receiving the force is arranged at the end of the rotational force receiving component 214, and a plurality of stress parts 2144 are arranged at the interior of the rotational force receiving component 214 along the inner circumference direction; the force transmission part 21311 is arranged in a gap among the stress columns 2121, and the force transmission part 21331 is arranged in a gap among the stress parts 2144; the intermediate force transmission component 213 is limited between the photosensitive member hub 212 and the rotational force receiving component 214; since the two ends of the intermediate force transmission component 213 are spherical parts, the intermediate force transmission component 213 can make offset at any degree relative to the axis of the photosensitive member hub 212 and the axis of the rotational force receiving component 214; said first force transmission part 21311 is engaged with the stress columns 2121 to transmit the force, and said second force transmission part 21331 is engaged with the stress parts 2144 to transmit the force.

Figure 7:
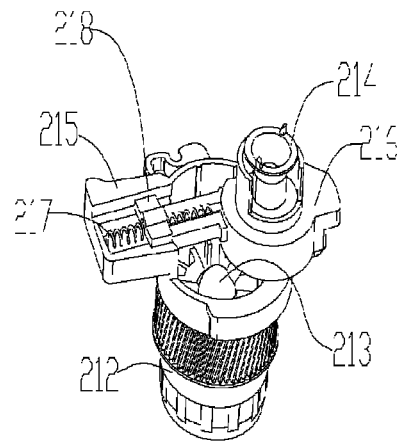
FIG. 7 illustrates a stereo view of a driving assembly at an initial state in the first embodiment.
Figure 8:
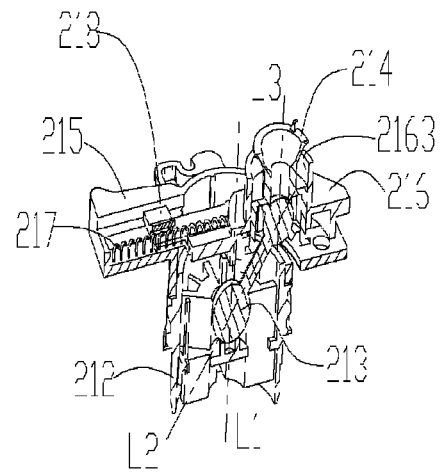
FIG. 8 illustrates a section view of FIG. 7.
Figure 9:
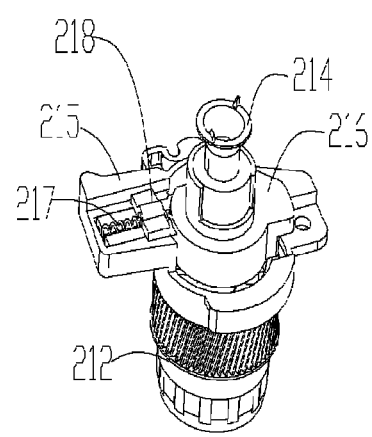
FIG. 9 illustrates a stereo view of the driving assembly at a working state in the first embodiment.
Figure 10:
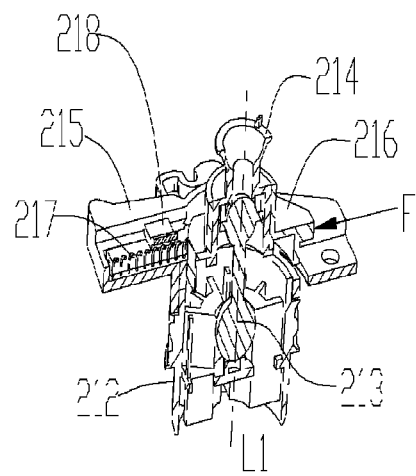
FIG. 10 illustrates a section view of FIG. 9.

FIG. 7 to FIG. 10 respectively describe two states of the driving assembly. FIG. 7 is a stereo view of the driving assembly at an initial state, and FIG. 8 is a section view of FIG. 7. Before the process cartridge is installed in the electrophotographic image forming device, the driving assembly is at the states shown in FIG. 7 and FIG. 8; after the process cartridge is installed in place, the driving assembly is at the state (working state) as shown in FIG. 9 and FIG. 10. Before the process cartridge is installed, under the effect of natural stretching of the first elastic element 217, the sliding piece is kept at the initial state through the first elastic element 217, namely the axis L3 of the sliding piece 216 is at an offset state with the axis L1 of the photosensitive member hub, and the rotational force receiving component 214 is retained in the inner hole 2163; meanwhile, the axis of the rotational force receiving component 214 and the axis L3 of the sliding piece 216 are coaxial, and at this moment, the rotational force receiving component 214 also shifts relative to the axis L1 of the photosensitive member hub along with the sliding piece 216, namely the axis L1 and the axis L3 do not coincide but are relatively parallel; since the intermediate force transmission component 213 is limited between the photosensitive member hub 212 and the force transmission component 214 and is mutually matched with the photosensitive member hub 212 and the force transmission component 214, when the rotational force receiving component 214 is at the initial position as shown in FIG. 8, the rotational force receiving component 214 drives the intermediate force transmission component 213 to be inclined relative to the axis L1 of the photosensitive member hub, and meanwhile the intermediate force transmission component 213 is also inclined relative to the axis L3 of the rotational force receiving component 214. Right now, the driving assembly is at the initial state, the axis L2 of the intermediate force transmission component 213 is inclined relative to the axis L1 of the photosensitive member hub and the axis L3 of the rotational force receiving component 214, namely included angles are formed between L2 and L1 and between L2 and L3. During the process that the process cartridge is installed in the electrophotographic image forming device, the sliding piece 216 is subjected to the effect of external force F along the negative direction of the installation direction of the process cartridge, and the force F overcomes the elastic force of the first elastic element 217 by driving the sliding piece 216 so that the sliding piece 216 slides inside the sliding rail 2151 along the negative direction of the installation direction of the process cartridge; right now, the rotational force receiving component 214 moves along with the sliding piece 216 and drives the intermediate force transmission component 213 to be gradually straightened (namely the included angles between L2 and L1 and between L2 and L3 gradually become smaller), and the end, engaged with said rotational force receiving component, of the intermediate force transmission component 213 gets close to said rotational force receiving component; finally, after the process cartridge is installed in place, the external force F overcomes the elastic force of the first elastic element 217 and enables the first elastic element 217 to be compressed, so that the intermediate force transmission component 213, the rotational force receiving component 214 and the sliding piece 216 are kept at the states as shown in FIG. 9 and FIG. 10, namely the working state of the driving assembly; right now, the axis L2 of the intermediate force transmission component and the axis L3 of the rotational force receiving component are coaxial to the axis L1 of the photosensitive member hub. Meanwhile, during the installation process of the process cartridge from the initial state to the working state, the intermediate force transmission component 213 is straightened from inclination, so that the rotational force receiving component 214 is provided with certain offset in the longitudinal direction of the process cartridge, namely the rotational force receiving component 214 can extend out in the longitudinal direction of the process cartridge.

Figure 11A:
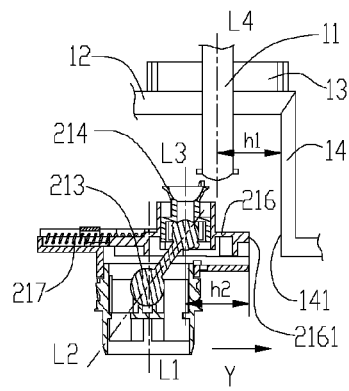
FIG. 11a illustrates a schematic diagram of the installation process of a process cartridge in the first embodiment.
Figure 11B:
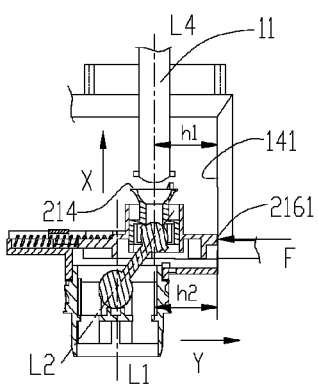
FIG. 11b illustrates a schematic diagram of the installation process of the process cartridge in the first embodiment.
Figure 11C:
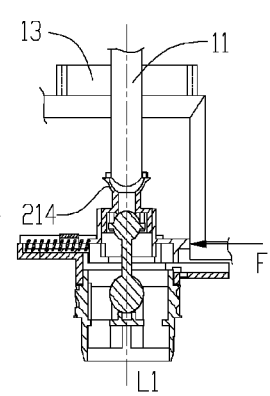
FIG. 11c illustrates a schematic diagram that the process cartridge is installed in place in the first embodiment.

FIG. 11a to FIG. 11c illustrate the schematic diagram of the process that the driving assembly is engaged with the rotational force driving head when the process cartridge is installed in the electrophotographic image forming device. As shown in FIG. 11a, 11 is the rotational force driving head arranged inside the electrophotographic image forming device, 13 is a driving gear for driving the rotational force driving head 11 to rotate, 12 is a right side wall of the electrophotographic image forming device, and 14 is a back side wall of the electrophotographic image forming device, wherein the rotational force driving head 11 and the driving gear 13 are both arranged on the right side wall 12 of the electrophotographic image forming device, and 141 is an inner side face, opposite to the installation direction of the process cartridge, of the back side wall 14. FIG. 11a illustrates the initial state of the driving assembly before the process cartridge is installed, the intermediate force transmission component 213 is inclined relative to the axis L1 of the photosensitive member hub and the axis L3 of the rotational force receiving component 214, the axis L3 of the rotational force receiving component 214 makes offset relative to the axis L1 of the photosensitive member hub, and the first elastic element 217 is at a natural stretching state so that the sliding piece 216 is kept at the initial state, and at this moment the rotational force receiving component 214 is at a retracting state. When the process cartridge is installed along the shown Y direction, the process cartridge gradually gets close to the inner side face 141 of the electrophotographic image forming device; since the rotational force receiving component 214 is at the retracting state all the time, during the installation process of the process cartridge, the rotational force receiving component 214 cannot interfere with the rotational force driving head 11; the process cartridge is installed continuously, the end face 2161 of the sliding piece 216 is firstly contacted with the inner side face 141 of the electrophotographic image forming device, the inner side face 141 generates the effect of the force F for the sliding piece 161, and the action effect of the force F is opposite to the Y direction of the installation direction of the process cartridge; as shown in FIG. 11b, at this moment, the rotational force receiving component 214 is coaxial to the rotational force driving head 11, but the rotational force receiving component 214 and the rotational force driving head 11 are not engaged with each other and do not interfere with each other, and the rotational force receiving component is at the retracting state; the process cartridge is installed continuously, the force F promotes the sliding piece 216 to slide relative to the photosensitive member 211 along the opposite direction of the Y direction, and the intermediate force transmission component 213 is driven to be gradually straightened through the rotational force receiving component 214, and the intermediate force transmission component 213 promotes the rotational force receiving component 214 to extend out along the longitudinal direction of the process cartridge, namely in the X direction as shown in FIG. 11c, during the straightening process. FIG. 11c illustrates the state that the process cartridge is installed in place, namely the process cartridge is at the working state, at this moment, the rotational force receiving component 214 is engaged with the rotational force driving head 11, and the rotational force driving head 11, the rotational force receiving component 214 and the intermediate force transmission component 213 are all coaxial to the axis L1 of the photosensitive member hub. When the electrophotographic image forming device is started, the driving gear 13 rotates to drive the rotational force driving head 11 to rotate, and thus the force is transmitted to the photosensitive member so as to enable the photosensitive member to rotate through the rotational force receiving component 214, the intermediate force transmission component 213 and the photosensitive member hub 212.

Figure 12A:
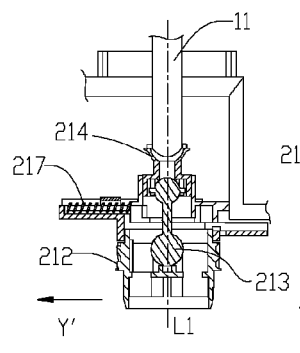
FIG. 12a illustrates a schematic diagram of the disassembly process of the process cartridge in the first embodiment.
Figure 12B:
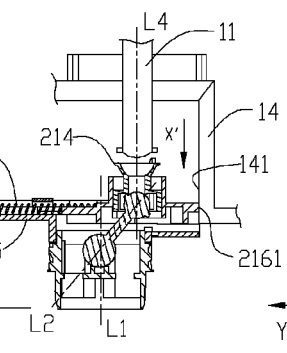
FIG. 12b illustrates a schematic diagram of the disassembly process of the process cartridge in the first embodiment.
Figure 12C:
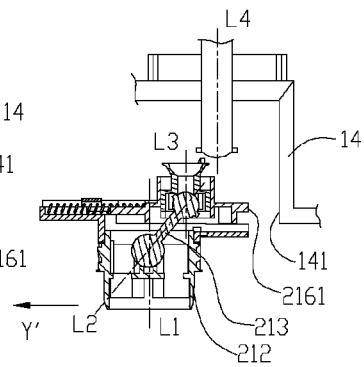
FIG. 12c illustrates a schematic diagram of the disassembly process of the process cartridge in the first embodiment.

FIG. 12a to FIG. 12c illustrate the schematic diagram of the process that the engagement between the driving assembly and the rotational force driving head is disengaged during the process that the process cartridge is disassembled from the electrophotographic image forming device. As shown in FIG. 12a, the process cartridge is disassembled from the electrophotographic image forming device along the direction (namely along the shown Y direction) opposite to the installation direction (Y direction). During the process that the process cartridge is disassembled gradually, since the force F gradually withdraws, the direction of elastic restoring force generated by the first elastic element 217 is opposite to the disassembly direction of the process cartridge, the elastic restoring force generated by the first elastic element 217 acts on the sliding piece 216, and thus deflection of the intermediate force transmission component 213 occurs; as shown in FIG. 12b, meanwhile, the restoring force of the elastic element enables the sliding piece 216 to slide inside the sliding rail 2151 along the opposite direction of the disassembly direction of the process cartridge, then the rotational force receiving component 214 is driven to retract along the opposite direction (namely shown X' direction) of the X direction when the deflection of the intermediate force transmission component occurs, and the engagement between the driving assembly and the rotational force driving head 11 is disengaged, so that the acting force F is gradually weakened until disappears; and as shown in FIG. 12c, the process cartridge is disassembled continuously, and the contact between the process cartridge and the electrophotographic image forming device is completely disengaged.

Through the embodiment, the process cartridge does not interfere with the rotational force driving head during the process that the process cartridge is installed in the electrophotographic image forming device; during the installation or disassembly process of the process cartridge and during the process that the contact of the end face of the sliding piece and the inner side face of the electrophotographic image forming device is still kept, the rotational force receiving component 214 does not relatively move in the installation direction of the process cartridge relative to the rotational force driving head 11; and only the rotational force receiving component 214 relatively moves in the axial direction relative to the rotational force driving head 11, and is engaged or disengaged with the rotational force driving head 11, thus the process cartridge is successfully installed.

Embodiment 2

FIG. 13 to FIG. 17 illustrate the second embodiment of the present invention.

Figure 13:
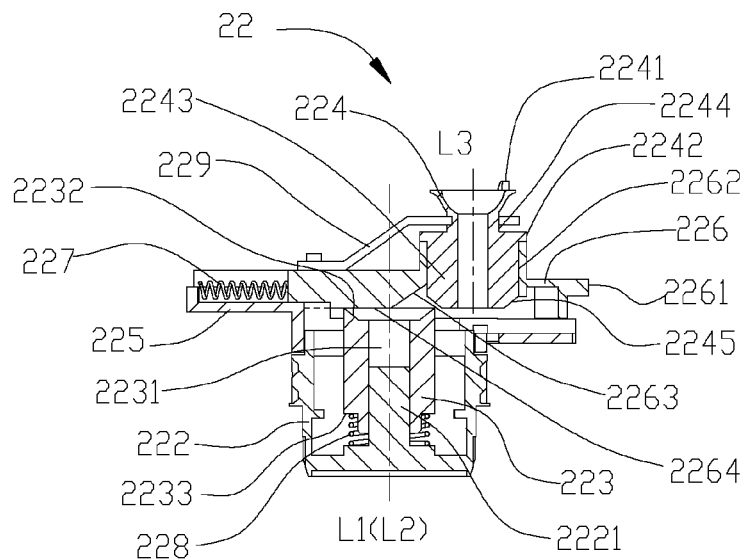
FIG. 13 illustrates a section view of a second embodiment in the present invention.
Figure 14:
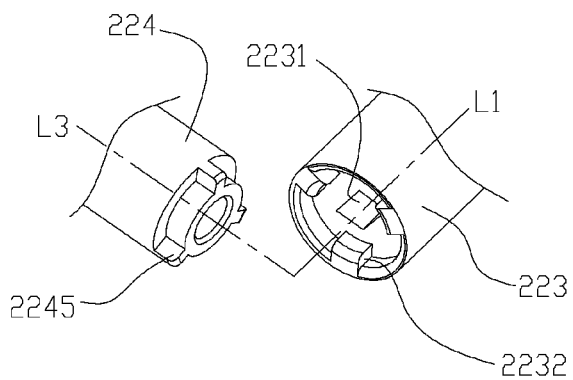
FIG. 14 illustrates a structure view of the force transmission part in the second embodiment.

FIG. 13 illustrates an assembly view of the driving assembly 22 in the second embodiment, 222 is a photosensitive member hub and has the axis L1, and a raised non-circular pin 2221 is arranged at the interior of the photosensitive member hub; 223 is an intermediate force transmission component and has the axis L2, the axis L2 is coaxial to the axis L1, a non-circular inner hole 2231 is further formed in the intermediate force transmission component, a plurality of protruding parts 2232 are arranged at the end of the intermediate force transmission component, and a boss surface 2233 is arranged on the outer circumference of the intermediate force transmission component; the intermediate force transmission component 223 is arranged inside the photosensitive member hub 222, and is matched with the pin 2221 inside the photosensitive member hub through the inner hole 2231 to transmit the force; a second elastic element 228 is arranged between the intermediate force transmission component 223 and the photosensitive member hub 222, one end of the second elastic element 228 abuts against the boss surface 2233 of the intermediate force transmission component 223, and the other end of the second elastic element 228 abuts against the interior of the photosensitive member hub 222; a side plate 225 is provided at one end of the photosensitive member hub 222, and is fixedly provided at the cartridge frame; a sliding piece 226 is arranged on the side plate 225, a sliding groove is formed in the side plate 225, and the assembly condition is the same as that in the first embodiment, an inner hole 2262 is formed in the sliding piece 226, a first elastic element 227 is arranged between the sliding piece 226 and the side plate 225, one end of the first elastic element 227 abuts against the sliding piece 226 and the other end of the first elastic element 227 abuts against the side plate 225, and the first elastic element 227 acts on the sliding piece 226 and enables it to be at the initial state of offset relative to the axis L1 of the photosensitive member hub; an inclined surface 2263 and a bottom surface 2264 are further arranged on the inner bottom surface of the sliding piece 226, the inclined surface 2263 can act on the end of the intermediate force transmission component 223 under the effect of the first elastic element 227, so that axial movement is generated, and the bottom surface 2264 can enable the intermediate force transmission component 223 to be kept at the retracting state; 224 is the rotational force receiving component engaged with the rotational force driving head provided inside the electrophotographic image forming device to transmit the force and has the axis L3, a force receiving part is arranged at one end of the rotational force receiving component 224, a claw 2241 capable of being engaged with the rotational force driving head to transmit the force is arranged on the rotational force receiving component, a boss 2242 is arranged on the outer circumference, the boss 2242 is used for abutting against one end face of the sliding piece 226, the neck part 2244 is used for connecting the boss 2242 with the force receiving part, a cylinder part 2243 is arranged at the other end of the rotational force receiving component 224, the cylinder part 2243 is matched with the inner hole 2262 inside the sliding piece 226, and the cylinder part is provided with a plurality of protruding column parts 2245 (as shown in FIG. 14) in the circumference direction of the cylinder part; 229 is a third elastic element, wherein one end of the third elastic element is fixedly arranged on the sliding piece 226, and the other end of the third elastic element is locked on the neck part 2244 of the rotational force receiving component 224.

Figure 15:
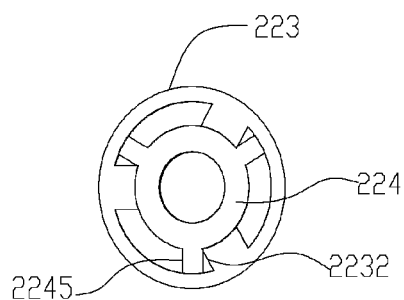
FIG. 15 illustrates an engaged cross section view of the force transmission part in the second embodiment.

FIG. 14 illustrates a specific structure view of engaged force transmission between the intermediate force transmission component 223 and the rotational force receiving component 224. As shown in the figure, a plurality of protruding parts 2232 are arranged on the inner circumference of the intermediate force transmission component 223, and correspondingly, a plurality of protruding column parts 2245 are arranged on the outer circumference of the rotational force receiving component 224; when the intermediate force transmission component 223 is engaged with the rotational force receiving component 224, the protruding parts 2232 and the protruding column parts 2245 are mutually engaged so that mutual force transmission can be realized. FIG. 15 illustrates a cross section view of an engaged part when intermediate force transmission component 223 is engaged with the rotational force receiving component 224.

The following describes the process that the process cartridge utilizing the driving assembly of the second embodiment is installed in the electrophotographic image forming device and disassembled from the electrophotographic image forming device in detail.

FIG. 16a to FIG. 16c illustrate the schematic diagram of the process that the driving assembly is engaged with the rotational force driving head when the process cartridge is installed in the electrophotographic image forming device. FIG. 16a illustrates a view of the initial state that said driving assembly 22 is installed on the process cartridge, the intermediate force transmission component 223 is kept at the retracting state under the effect of the sliding piece 226, and the second elastic element 228 is at a compressed state; and under the effects of the first elastic element 227 and the sliding piece 226, the rotational force receiving component 224 is kept at the offset state relative to the axis L1 of the photosensitive member hub. The process cartridge is installed in the electrophotographic image forming device along the Y direction, the end face 2261 of the sliding piece 226 is firstly contacted with the inner side face 141 of the electrophotographic image forming device, and at this moment, as shown in FIG. 16b, the inner side face 141 generates acting force F with a direction opposite to the installation direction of the process cartridge for the sliding piece 226. The process cartridge is continuously installed, under the effect of the force F, the first elastic element 227 is gradually compressed, the sliding piece 226 overcomes the elastic force of the first elastic element 227 to slide relatively along the direction opposite to the installation direction of the process cartridge, and drives the rotational force receiving component 224 to relatively move along the direction opposite to the installation direction of the process cartridge, and at this moment, the intermediate force transmission component gets close to the inner side face of the electrophotographic image forming device together with the process cartridge along with the installation of the process cartridge, namely the intermediate force transmission component 223 moves relative to the rotational force receiving component 224, and the axes L2 and L3 get close to each other; along with the installation of the process cartridge, during the sliding process of the sliding piece, the contact between the bottom surface 2264 of the sliding piece 226 and the end face of the intermediate force transmission component 223 is gradually disengaged, and the intermediate force transmission component 223 extends out along the longitudinal direction (namely the shown X direction) of the process cartridge under the effect of the elastic restoring force of the second elastic element 228. When the process cartridge is installed in place, as shown in FIG. 16c, FIG. 16c illustrates the working state of the driving assembly 22. The intermediate force transmission component 223 extends out along the shown X direction under the effect of the elastic restoring force of the second elastic element 228, and is engaged with the rotational force receiving component 224; after the intermediate force transmission component 223 and the rotational force receiving component 224 are engaged, the intermediate force transmission component goes on extending out, and promotes the rotational force receiving component 224 to extend out along the X direction all together to be engaged with the rotational force driving head 11 arranged inside the electrophotographic image forming device. At this moment, the photosensitive member hub 222, the intermediate force transmission component 223, the rotational force receiving component 224 and the rotational force driving head 11 are all coaxial. After the electrophotographic image forming device is started, the rotational force driving head 11 is driven to rotate by the driving gear 13, the rotational force driving head is engaged with the claw 2241 of the rotational force receiving component 224 so as to transmit the force to the rotational force receiving component 224, and rotational force is transmitted to the photosensitive member hub through the engagement between the rotational force receiving component 224 and the intermediate force transmission component 223 and the engagement between the intermediate force transmission component 223 and the photosensitive member hub, and thus the purpose (the photosensitive member hub and the photosensitive member is in close fit and are coaxial) of driving the photosensitive member to rotate by the photosensitive member hub 222 is achieved.

FIG. 17a to FIG. 17c illustrate the schematic diagram of the process that the engagement between the driving assembly and the rotational force driving head is disengaged during the process that the process cartridge is disassembled from the electrophotographic image forming device. As shown in FIG. 17a, the process cartridge is disassembled along the direction (namely the shown Y' direction) opposite to the installation process of the process cartridge. Along with the disassembly of the process cartridge, the force F of the inner side face 141 of the electrophotographic image forming device to the sliding piece 226 is gradually weakened and even disappears, the sliding piece 226 slides along the direction opposite to the disassembly direction of the process cartridge under the effect of the elastic restoring force of the first elastic element 227, the inclined surface 2263 acts on the intermediate force transmission component 223 and enables the intermediate force transmission component 223 to be retracted along the direction of the axis L1, and meanwhile the second elastic element 228 is compressed; during the process that intermediate force transmission component 223 is retracted, the engagement between the intermediate force transmission component 223 and the rotational force transmission component 224 is gradually disengaged, and when the bottom surface 2264 of the sliding piece 226 abuts against the end face of the intermediate force transmission component 223, the intermediate force transmission component can be kept at the retracted state; after the engagement between the intermediate force transmission component 223 and the rotational force receiving component 224 is disengaged, as shown in FIG. 17b, the rotational force transmission component 224 is retracted along the opposite direction (namely the shown X' direction) of the X direction under the effect of the third elastic element 229. The process cartridge is continuously disassembled, the contact between the process cartridge and the electrophotographic image forming device is completely disengaged, and as shown in FIG. 17c, the process cartridge is disassembled from the electrophotographic image forming device.

Embodiment 3

FIG. 18 to FIG. 21 illustrate the third embodiment of the present invention.

Figure 18:
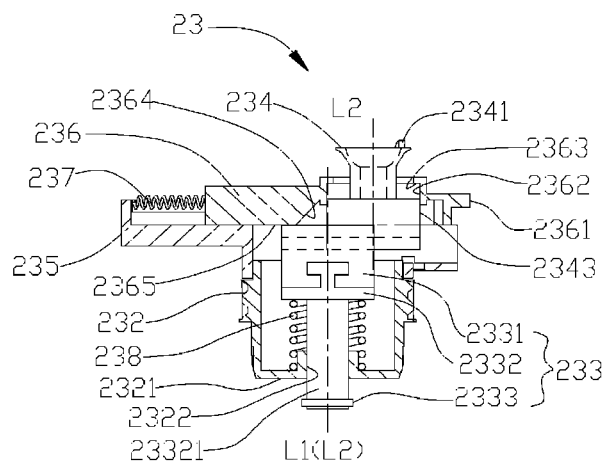
FIG. 18 illustrates a section view of a third embodiment in the present invention.

FIG. 18 is an assembly view of the driving assembly 23 in the third embodiment. 232 is a photosensitive member hub provided at one end of the photosensitive member in the longitudinal direction, the photosensitive member hub 232 has the axis L1, the cavity is formed in the interior of the photosensitive member hub 232, a bottom 2321 is further arranged, and a non-circular hole 2322 is formed in the bottom; 233 is the intermediate force transmission component, and the intermediate force transmission component 233 has the axis L2, is arranged in the photosensitive member hub 232, and is coaxial to the photosensitive member hub; the intermediate force transmission component 233 comprises three parts which are an intermediate connecting piece 2331, an end connecting piece 2332 and a pin 2333, and the pin can axially limit the intermediate force transmission component 233; 234 is the rotational force receiving component, a rotational force receiving end is arranged on the rotational force receiving component 234, a claw 2341 capable of being engaged with the rotational force driving head arranged inside the electrophotographic image forming device to transmit the force is arranged on the rotational force receiving end, a cylinder part 2343 is arranged at the other end of the rotational force receiving component, and the other end of the rotational force receiving component is connected with the intermediate connecting piece 2331; a side plate 235 is provided at one end of the photosensitive member hub, a sliding piece 236 is further arranged on the side plate 235, a sliding groove is formed in the side plate 235, the setting condition of the sliding piece 236 on the side plate 235 is the same as that in the first embodiment; a first elastic element 237 is arranged between the side plate 235 and the sliding piece 236, one end of the first elastic element 237 abuts against the side plate 235, and the other end of the first elastic element 237 abuts against the sliding piece 236; the sliding piece 236 is provided with an end face 2361, an inner hole 2362, an inner end face 2363, an inclined surface 2364 and a bottom surface 2365; the rotational force receiving component 234 is arranged in the inner hole 2362 of the sliding piece 236 in a penetrated manner, the cylinder part 2343 is matched with the inner hole 2362, and the rotational force receiving component 234 can slide relative to the inner hole 2362; under the effect of the first elastic element 237, the sliding piece 236 is kept at an offset state relative to the axis L1 of the photosensitive member hub 232; one end of a second elastic element 238 abuts against the bottom 2321 of the photosensitive member hub 232, and the other end of the second elastic element 238 abuts against the end connecting piece 2332 of the intermediate force transmission component 233; when the sliding piece 236 is at the offset state, the bottom surface 2365 of the sliding piece 236 abuts against one part of the intermediate force transmission component 233, so that the intermediate force transmission component 233 is integrally at the retracted state, and the second elastic element 238 is at a compressed state; and since the rotational force receiving component 234 is connected with the intermediate connecting piece 2331, the rotational force receiving component 234 is subjected to the traction of the intermediate connecting piece 2331 and is also at the retracted state. FIG. 18 illustrates the initial state of the driving assembly 23.

Figure 19:
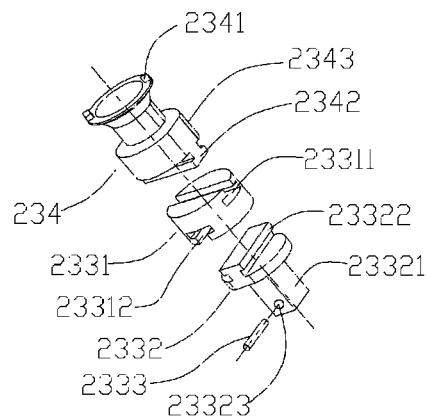
FIG. 19 illustrates a structure view of the force transmission part in the third embodiment.

FIG. 19 illustrates the specific structure and connection relation between the intermediate force transmission component 233 and the rotational force receiving component 234. Limit guide rails with limit effect are arranged at the two ends of the intermediate connecting piece 2331 and are respectively arranged to be grooves 23311 and 23312, and the two grooves are arranged perpendicular to each other and can be arranged to be of T-shaped groove structures; a key 23322 capable of being matched with the groove 23312 is arranged at one end of the end connecting piece 2232, said key is a T-shaped key correspondingly, a non-circular column 23321 is arranged at the other end of the end connecting piece 2232, the non-circular column 23321 can be matched with the non-circular hole 2322 inside the photosensitive member hub 232 to transmit the force, and a hole 23323 is formed in the non-circular column 23321 for putting the pin 2333; a force receiving part is arranged at one end of the rotational force transmission component 234, the claw 2341 is arranged at the end of the rotational force transmission component 234, and a T-shaped key 2342 capable of being matched with the T-shaped groove 23311 is arranged at the other end of the rotational force transmission component 234. Each of the connection between the intermediate connecting piece 2331 and the end connecting piece 2332 and the connection between the intermediate connecting piece 2331 and the rotational force transmission component 234 has the function of a coupling; the T-shaped keys and the T-shaped grooves can slide relatively; the shape of T has a limiting effect, and can prevent mutual disengaging between components.

Assuredly, in the embodiment, the T-shaped grooves can also be respectively arranged on the rotational force receiving component 234 and on the end connecting piece 2332, and correspondingly the T-shaped keys are arranged on the two ends of the intermediate connecting piece 2331.

The matching between said T-shaped grooves and said T-shaped keys is only a preferable embodiment of the present invention, and can also be other embodiments, and said T shapes can be symmetrical and can also be asymmetrical; said keys and said grooves can be in plane contact and can also be in arc surface contact. While the matching between the keys and the grooves needs relative sliding, certain limit effect exists in the axial direction of each component, and the force can be transmitted in a mutually matched manner.

In the embodiment, the non-circular hole and the non-circular column are used for transmitting the force in a mutually matched manner, said non-circular hole is arranged to be a square hole, and said non-circular column is arranged to be a direction column.

The following describes the process that the process cartridge utilizing the driving assembly of the third embodiment is installed in the electrophotographic image forming device and disassembled from the electrophotographic image forming device in detail.

Figure 20A:
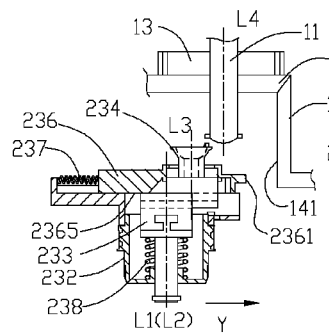
FIG. 20a illustrates a schematic diagram of the installation process of the process cartridge in the third embodiment.
Figure 20B:
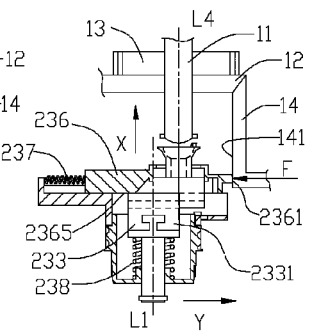
FIG. 20b illustrates a schematic diagram of the installation process of the process cartridge in the third embodiment.
Figure 20C:
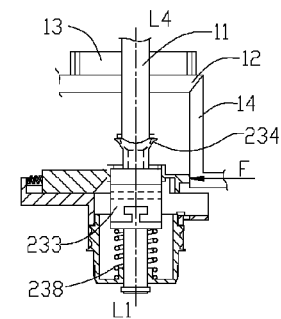
FIG. 20c illustrates a schematic diagram that the process cartridge is installed in place in the third embodiment.

FIG. 20a to FIG. 20c illustrate the schematic diagram of the process that the driving assembly is engaged with the rotational force driving head when the process cartridge is installed in the electrophotographic image forming device. FIG. 20a illustrates a view that the driving assembly 23 is at the initial state, the axis of the rotational force receiving component 234 is L3, at this moment, the axis L3 makes offset relative to the axis L1 of the photosensitive member hub and the axis L2 of the intermediate force transmission component, the process cartridge is installed along the shown Y direction, and when the driving assembly is at the initial state, the rotational force receiving component 234 is at the retracted state, so that when the process cartridge is installed, the rotational force receiving component 234 does not interfere with the rotational force driving head 11 arranged inside the electrophotographic image forming device. As shown in FIG. 20a, 12 is the right side wall of the electrophotographic image forming device, 14 is the back side wall of the electrophotographic image forming device, the rotational force driving head 11 is arranged on the right side wall 12, and the driving gear 13 is used for driving the rotational force driving head 11 to rotate. The process cartridge is installed along the Y direction, the end face 2361 of the sliding piece 236 is firstly contacted with the back side face 141 of the electrophotographic image forming device, and the back side wall 14 generates the acting force F to the sliding piece 236, as shown in FIG. 20b. The process cartridge is continuously installed, under the effect of the acting force F, the sliding piece 236 slides along the direction opposite to the installation direction of the process cartridge, and the first elastic element 237 is gradually compressed; when the sliding piece 236 moves to a certain degree, the contact between the bottom surface 2365 of the sliding piece 236 and the intermediate connecting piece 2331 is disengaged, the intermediate force transmission component 233 can extend out along the direction of the axis L1 of the photosensitive member hub under the effect of the elastic restoring force of the second elastic element 238, and meanwhile the rotational force receiving component 234 is pushed to extend out along the longitudinal direction (namely the shown X direction) of the process cartridge; and after the process cartridge is installed in place, the rotational force receiving component 234 extends out to be engaged with the rotational force driving head 11 inside the electrophotographic image forming device, as shown in FIG. 20c, namely the driving assembly is at the working state. After the electrophotographic image forming device is started, the rotational force driving head 11 is driven to rotate by the driving gear 13, the rotational force receiving component 234 is driven to rotate, and thus the photosensitive member hub 232 is driven to rotate by the intermediate force transmission component, and finally the photosensitive member arranged in the process cartridge is driven to rotate by the photosensitive member hub 232. At this moment, axes of the photosensitive member 231, the photosensitive member hub 232, the rotational force receiving component 234 and the rotational force driving head 11 are basically coaxial.

Figure 21A:
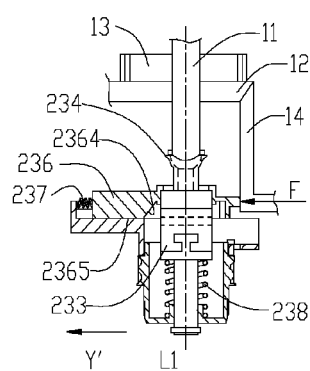
FIG. 21a illustrates a schematic diagram of the disassembly process of the process cartridge in the third embodiment.
Figure 21B:
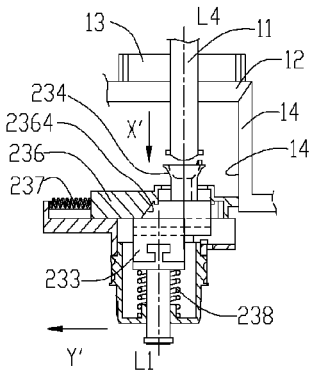
FIG. 21b illustrates a schematic diagram of the disassembly process of the process cartridge in the third embodiment.
Figure 21C:
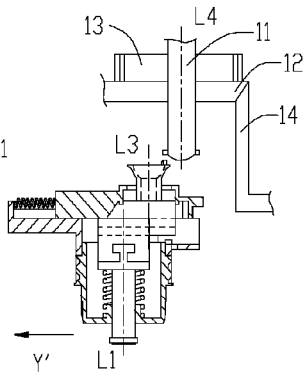
FIG. 21c illustrates a schematic diagram of the disassembly process of the process cartridge in the third embodiment.

FIG. 21a to FIG. 21c illustrate the schematic diagram of the process that the engagement between the driving assembly and the rotational force driving head is disengaged during the process that the process cartridge is disassembled from the electrophotographic image forming device. As shown in FIG. 21a, the process cartridge is disassembled from the electrophotographic image forming device along the direction (namely the shown Y' direction) opposite to the installation process of the process cartridge. Along with the movement of the process cartridge, the acting force F of the back side wall 14 to the sliding piece 236 is gradually weakened and even disappears, the sliding piece 236 moves along the direction opposite to the disassembly direction of the process cartridge under the effect of the elastic restoring force of the first elastic element 237, and the rotational force receiving component 234 is driven to slide, so that the rotational force receiving component 234 makes offset relative to the axis of the intermediate force transmission component 233; meanwhile, during the sliding process of the sliding piece 236, the inclined surface 2364 of the sliding piece 236 abuts against the part of the intermediate force transmission component 233, the intermediate force transmission component 233 is promoted to overcome the retraction of the elastic force of the second elastic element 238, and meanwhile the intermediate force transmission component 233 drives the rotational force receiving component 234 to be retracted along the shown X' direction as shown in FIG. 21b during the moving process of the process cartridge. As shown in FIG. 21b, the initial state of the driving assembly 23 is restored, the engagement between the rotational force receiving component 234 and the rotational force driving head 11 of the electrophotographic image forming device is disengaged, and then the process cartridge is successfully disassembled from the electrophotographic image forming device, as shown in FIG. 21c.

In the scheme of the present invention, if the distance between the axis L4 of the rotational force driving head 11 inside the electrophotographic image forming device and the inner side face 141 inside the electrophotographic image forming device is h1, since the rotational force receiving component 214 (224 or 234) extends out along the longitudinal direction of the process cartridge to be engaged with said rotational force driving head 11 to transmit the force, in order to guarantee successful engagement between the rotational force receiving component and the rotational force driving head, the distance h2 between the axis L3 of said rotational force receiving component and the end face 2161 (2261 or 2361) of said sliding piece 216 (226 or 236) is set to be equal to h1, as shown in FIG. 11a and FIG. 11b. The distance between the axis L4 of the rotational force driving head 11 in said electrophotographic image forming device and the inner side face 141 in the electrophotographic image forming device is h1, namely the distance between the axis L4 and the acting point of the external acting force F.

Through the embodiment of the present invention, the process cartridge can be successfully installed in the electrophotographic image forming device but does not generate the interference problem that the process cartridge cannot be installed in place with the rotational force driving head of the electrophotographic image forming device.

FIG. 22 to FIG. 25 illustrate the fourth embodiment of the present invention.

The driving assembly of the fourth embodiment comprises the same structure in the first embodiment, and the difference is that a buffer piece 99 is additionally arranged in the driving assembly 21. During the process that the rotational force receiving component 214 is contacted and engaged with the rotational force driving head 11, the rotational force receiving component 214 has certain pressure buffer capacity.

Figure 22:
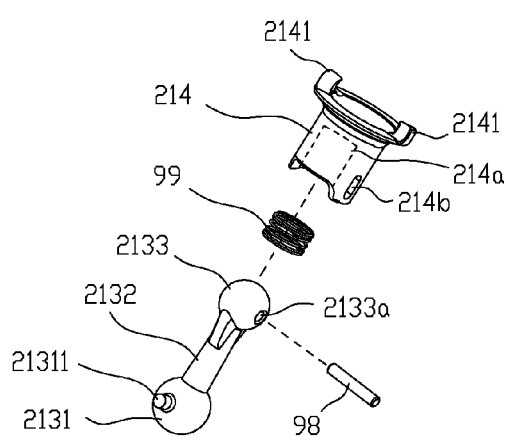
FIG. 22 and FIG. 23 illustrate structural views of a rotational force receiving component and an intermediate force transmission component in the fourth embodiment.
Figure 23:
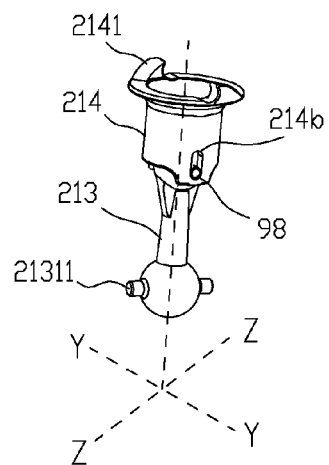

As shown in FIG. 22 and FIG. 23, a recess 214a is formed in one end of the rotational force receiving component 214, and a sliding groove 214b is formed in the outer surface of the rotational force receiving component 214; a through hole 2133a is formed in the surface of the second end spherical part 2133 of the intermediate force transmission component 213. The connection relation between the rotational force receiving component 214 and the intermediate force transmission component 213 is that the buffer piece 99 is provided in the recess 214a, the sliding groove 214b of the rotational force receiving component 214 and the through hole 2133a of the second end spherical part 2133 are penetrated through by a positioning pin 98. After the rotational force receiving component 214 and the intermediate force transmission component 213 are assembled, the buffer piece 99 is at a slightly compressed state, so that the elastic force of the buffer piece 99 always acts on the rotational force receiving component 214 and the intermediate force transmission component 213.

Figure 24:
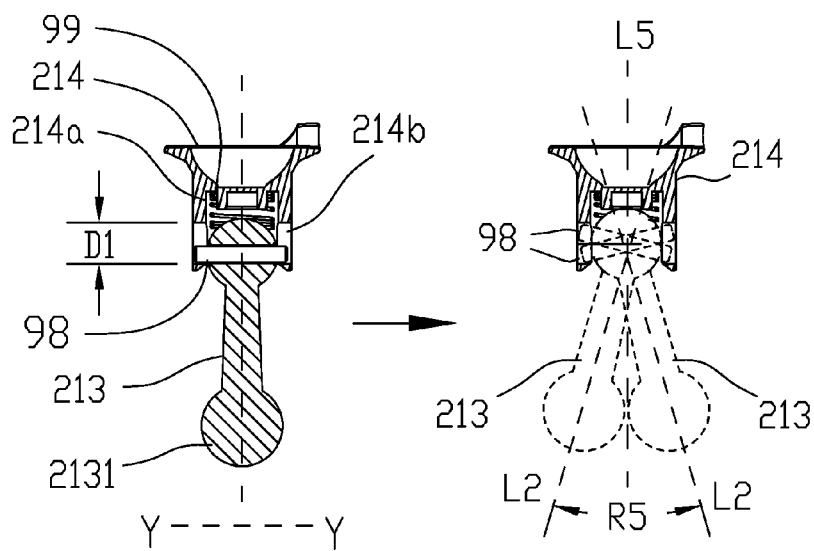
FIG. 24 and FIG. 25 illustrate an action schematic diagram of the rotational force receiving component and the intermediate force transmission component in the fourth embodiment.
Figure 25:
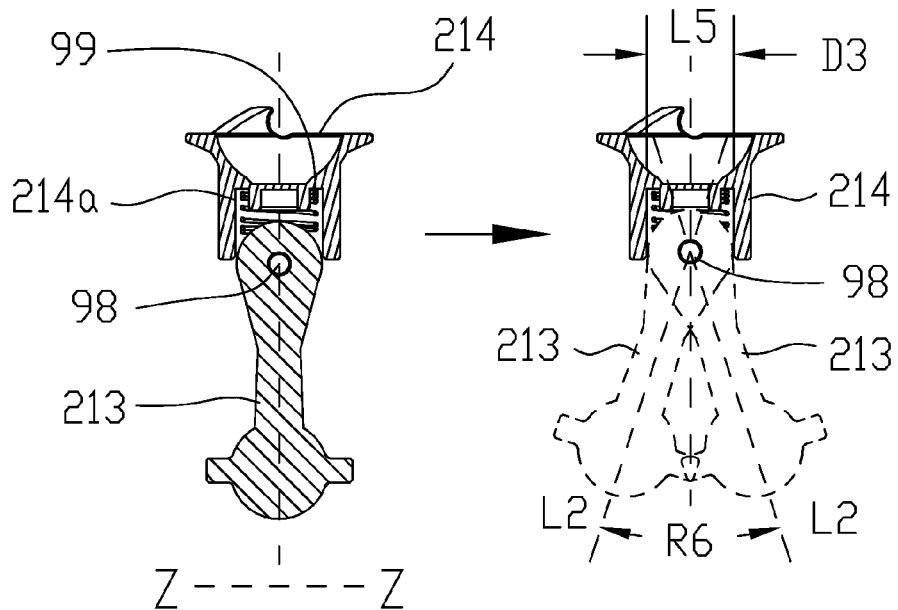

FIG. 24 and FIG. 25 illustrate action schematic diagram of the intermediate force transmission component 213 after the rotational force receiving component 214 and the intermediate force transmission component 213 are assembled. FIG. 24 illustrates a section view in the Y direction after the rotational force receiving component 214 and the intermediate force transmission component 213 are assembled. Because of the width D1 of the sliding groove 214b and the structure of the second end spherical part 2133, the positioning pin 98 arranged at one end of the intermediate force transmission component 213 is limited in the sliding groove 214b, and the intermediate force transmission component 213 can realize inclined pendulum motion relative to the rotational force receiving component 214, namely the axis L2 of the intermediate force transmission component 213 can incline relative to the axis L5 of the rotational force receiving component 214. The larger the width D1 of the sliding groove 214b is, the larger the inclined pendulum range R5 of the intermediate force transmission component 213 is. FIG. 25 illustrates the section view in the Z direction (the Z direction is basically vertical to the Y direction) after the rotational force receiving component 214 and the intermediate force transmission component 213 are assembled, the intermediate force transmission component 213 can realize inclined pendulum motion relative to the rotational force receiving component 214, namely, the intermediate force transmission component 213 can rotate around the positioning pin 98, and similarly, the axis L2 of the intermediate force transmission component 213 can incline relative to the axis L5 of the rotational force receiving component 214. The inner diameter D3 of the recess 214a of the rotational force receiving component 214 limits the pendulum range of the intermediate force transmission component 213, and the larger the inner diameter D3 of the recess 214a is, the larger the inclined pendulum range R6 of the intermediate force transmission component 213 is.

Said buffer piece 99 is arranged in the driving assembly 21, and enables the rotational force receiving component 214 to have certain pressure buffer capacity. During the process that the driving assembly 21 is engaged with the rotational force driving head 11 (refer to FIG. 11a to FIG. 11c), since the rotational force receiving component 214 extends out, even if certain probability that the top of the claw 2141 structurally interferes with or rigidly collides with the forefront ends of the transmission pins 111 mutually exists, the claw 2141 can obtain the stress of the transmission pins 111 at the same time so that the rotational force receiving component 214 realizes inward retracted movement relative to the intermediate force transmission component 213 to prevent from generating further mutual interference with the transmission pins 111, and the claw 2141 obtains certain pressure buffer in virtue of the telescopic elastic force of the buffer piece 99 to prevent from being damaged by rigid collision. When the rotational force driving head 11 begins to operate, the transmission pins 111 can prevent from being contacted with the top of the claw 2141 because of the rotation, the stress of the claw 2141 disappears, and the rotational force receiving component 214 is not compressed any longer and obtains the elastic force of the buffer piece 99, so that the rotational force receiving component 214 extends outwards relative to the intermediate force transmission component 213 to realize the engagement with the rotational force driving head 11 so as to receive the power.

Said buffer piece 99 can be a spring or elastic sponge or elastoplastic.

Said positioning pin 98 can be replaced by a latching structure.

Figure 26:
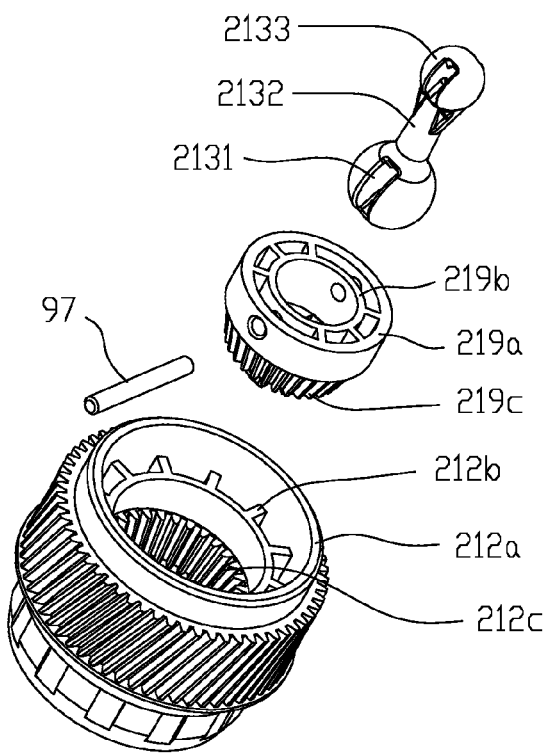
FIG. 26 is a partial assembly schematic diagram of the driving assembly in a fifth embodiment.
Figure 27:
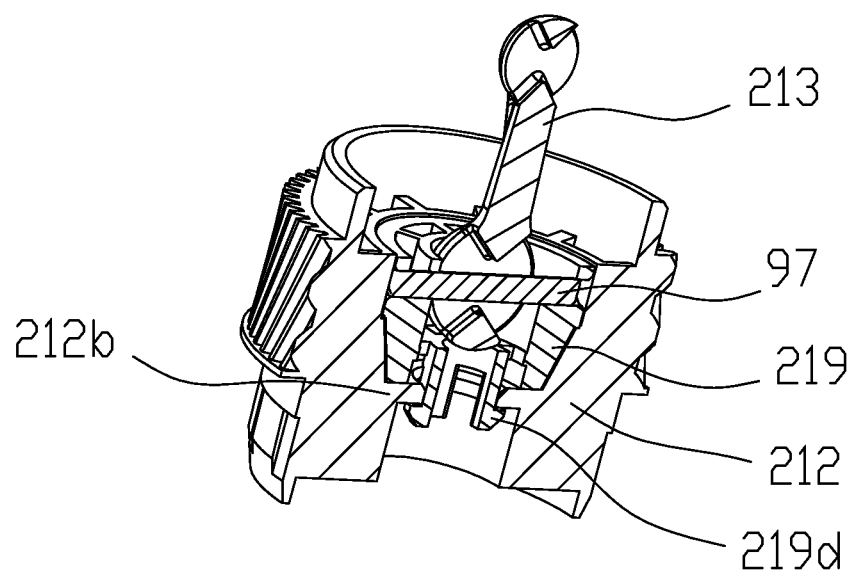
FIG. 27 is a partial section view of the driving assembly in the fifth embodiment.

FIG. 26 to FIG. 27 illustrate the fifth embodiment of the present invention.

The driving assembly of the fifth embodiment comprises same elements in the first embodiment or the fourth embodiment, and the difference is the connection manner of the driving assembly and an end gear of a photosensitive drum. Specifically, As shown in FIG. 26 and FIG. 27, a connecting column 219 may comprise an inner ring 219b and an outer ring 219a, and said inner ring 219b and said outer ring 219a can be connected through a connecting rib.

The outer ring 219a of the connecting column 219 is provided with outer conical teeth 219c, namely the outer ring 219a of the connecting column 219 is a circular cone inclined surface, and the outer conical teeth 219c are arranged on the circular cone inclined surface. The inner ring 212b of the photosensitive member hub 212 is provided with inner conical teeth 212c matched with the outer conical teeth 219c, namely the inner ring 212b of the photosensitive member hub 212 is an inversely circular cone inclined surface, and the inner conical teeth 212c are arranged on the inversely circular cone inclined surface. As said guiding mechanisms, the outer conical teeth 219c and the inner conical teeth 212c enable the connecting column 219 to be installed in the photosensitive member hub 212. The connecting column 219 is arranged in the inner ring 212b of the photosensitive member hub 212 in a penetrated manner, and the outer conical teeth 219c is engaged with the inner conical teeth 212c so as to drive the photosensitive member hub 212 to rotate. On the other hand, the outer conical teeth 219c and inner conical teeth 212c also achieve the guiding effect when the connecting column 219 is arranged in the inner ring of the photosensitive member hub 212 in a penetrated manner. Here, the connecting column 219 and the photosensitive member hub 212 can be fixedly connected in an adhesive bonding or welding manner, or, a first claw 219d can be arranged on the inner ring 219b of the connecting column 219, and when the connecting column 219 is arranged in the inner ring 212b of the photosensitive member hub 212 in a penetrated manner from the top down, the first claw 219d is clamped on the inner ring 212b of the photosensitive member hub 212 from the inside to outside from the lower part of the inner ring 212b of the photosensitive member hub 212, so that the connecting column 219 cannot be disengaged from the photosensitive member hub 212 upwards. The outer surface of one end, connected with the intermediate force transmission component 213, of the connecting column 219 can be arranged to be a cylinder surface, and a through hole for being penetrated through by the connecting pin 97 is formed in the cylinder surface.

The connecting column 219 obtained by adopting said technical scheme is clamped on the photosensitive member hub 212 by adopting the first claw 219d, the outer conical teeth 219c are arranged on the outer ring of the connecting column 219, the inner conical teeth 212c are arranged on the inner ring of the photosensitive member hub 212, the transmission of rotational torque for the connecting column 219 to the photosensitive member hub 212 is realized in the manner that the outer conical teeth 219c are engaged with the inner conical teeth 212c, and firm connection among the intermediate force transmission component 213, the connecting column 219 and the photosensitive member hub 212 is further realized, so that the intermediate force transmission component 213 and the connecting column 219 are unlikely to be disengaged from the photosensitive member hub 212, the failure rate of the driving assembly is reduced, and the stability is improved.

On the basis of the technical scheme, the diameters of openings at the two ends of the through hole of the first end spherical part 2131 on the intermediate force transmission component 213 can be greater than that of the through hole; FIG. 27 illustrates the section view of the intermediate force transmission component 213, and the two ends of the through holes are fan-shaped, so that the angle range of relative rotation between the intermediate force transmission component 213 and the connecting column 219 is greater, and the rotation is more flexible. Similarly, the diameters of openings at the two ends of the through hole of the second end spherical part 2133 on the intermediate force transmission component 213 can be greater than that of the through hole, and the two ends of the through hole are approximately fan-shaped, so that the angle range of relative rotation between the intermediate force transmission component 213 and the rotational force receiving component 214 is greater, and the rotation is more flexible.

The invention claimed is:

1. A rotational force driving assembly used for being engaged with a rotational force driving head inside an electrophotographic image forming device to transmit rotational driving force, said rotational force driving assembly comprising:
   a hub,
   a rotational force receiving component for driving the hub to rotate, and
   a side plate provided at a first end of the hub,
   wherein the rotational force driving assembly further comprises an axis offset adjusting mechanism, the axis offset adjusting mechanism connected to said side plate, and configured to extend and retract the rotational force receiving component;
   wherein when the axis offset adjusting mechanism is not subjected to external force, said axis offset adjusting mechanism is configured to align the rotational force receiving component parallel to and offset from the axis of the hub; and
   wherein when the axis offset adjusting mechanism is subjected to external force, the axis offset adjusting mechanism is configured to align the axis of the rotational force receiving component to be coaxial with the axis of the hub, and when the rotational force receiving component is positioned coaxially to the hub, the rotational force receiving component extends out along the axial direction towards the hub to engage the rotational force driving head.

2. The rotational force driving assembly according to claim 1, wherein the rotational force driving assembly further comprises an intermediate force transmission component, and wherein the intermediate force transmission component is mated with the rotational force receiving component and the hub to transmit force.

3. The rotational force driving assembly according to claim 2, wherein the axis offset adjusting mechanism further comprises a sliding piece and a first elastic element; the sliding piece is connected with the rotational force receiving component, and the first elastic element is arranged between the side plate and the sliding piece; when the axis offset adjusting mechanism is not subjected to external force, the first elastic element enables the sliding piece to be parallel to and offset from the axis of the hub.

4. The rotational force driving assembly according to claim 3, wherein a sliding rail is arranged on the side plate, said sliding piece is connected with the side plate through the sliding rail, a handle end matched with the sliding rail is arranged on the sliding piece, and an accommodating groove for accommodating the first elastic element is formed in the handle end.

5. The rotational force driving assembly according to claim 4, wherein the intermediate force transmission component comprises a first end spherical part, a second end spherical part and an intermediate connecting part, the first end spherical part is provided with a first force transmission part capable of being engaged with the hub, and the second end spherical part is provided with a second force transmission part capable of being engaged with the rotational force receiving component.

6. The rotational force driving assembly according to claim 4, wherein the rotational force driving assembly further comprising a second elastic element arranged between the intermediate force transmission component and the hub, the intermediate force transmission component is arranged in the hub, the sliding piece comprises an inner hole, a cylinder part is arranged at one end of the rotational force receiving component, and the cylinder part is matched with the inner hole of the sliding piece.

7. The rotational force driving assembly according to claim 4, wherein the rotational force driving assembly further comprising a second elastic element arranged between the intermediate force transmission component and the hub, the intermediate force transmission component is arranged in the hub, the sliding piece is provided with a bottom surface and an inner hole, the rotational force receiving component is arranged to be matched with the inner hole and can axially slide relative to the inner hole, said bottom surface can abut the intermediate force transmission component, said intermediate force transmission component is in a retracted state when the bottom surface abuts against said intermediate force transmission component.

8. The rotational force driving assembly according to claim 2, wherein a buffer piece is further provided between the rotational force receiving component and the intermediate force transmission component.

9. The rotational force driving assembly according to claim 8, wherein a recess is formed in one end of the rotational force receiving component, the intermediate force transmission component comprises an end spherical part, the buffer piece is provided in the recess, and the end spherical part abuts against the buffer piece; and the rotational force receiving component and the intermediate force transmission component are connected through a pin or a latch.

10. The rotational force driving assembly according to claim 2, wherein the rotational force driving assembly further comprises a connecting column and a connecting pin; wherein said connecting pin penetrates through a hole for connecting the intermediate force transmission component and the connecting column; and the connecting column is connected to the hub.

11. The rotational force driving assembly according to claim 10, wherein the rotational force driving assembly further comprise guiding mechanisms, said guiding mechanisms are arranged on the connecting column and the hub so that the connecting column is installed inside the hub through the guiding mechanisms.

12. A process cartridge comprising:
a cartridge;
a rotational force driving assembly used for being engaged with a rotational force driving head inside an electrophotographic image forming device to transmit rotational driving force; said rotational force driving assembly comprising a hub, a rotational force receiving component for driving said hub to rotate and a side plate provided at one end of said hub,
wherein said rotational force driving assembly further comprising an axis offset adjusting mechanism, said axis offset adjusting mechanism is arranged at said side plate and enables said rotational force receiving component to extend and retract; and
wherein when the axis offset adjusting mechanism is not subjected to external force, said axis offset adjusting mechanism is configured to align the rotational force receiving component parallel to and offset from the axis of the hub; and
wherein when the axis offset adjusting mechanism is subjected to external force, the axis offset adjusting mechanism is configured to align the axis of the rotational force receiving component to be coaxial with the axis of the hub, and when the rotational force receiving component is positioned coaxially to the hub, the rotational force receiving component extends out along the axial direction towards the hub to engage the rotational force driving head.

* * * * *